(No Model.)
B. G. REESE & D. B. CADE.
COMBINED MEASURE AND FUNNEL.
No. 525,232. Patented Aug. 28, 1894.
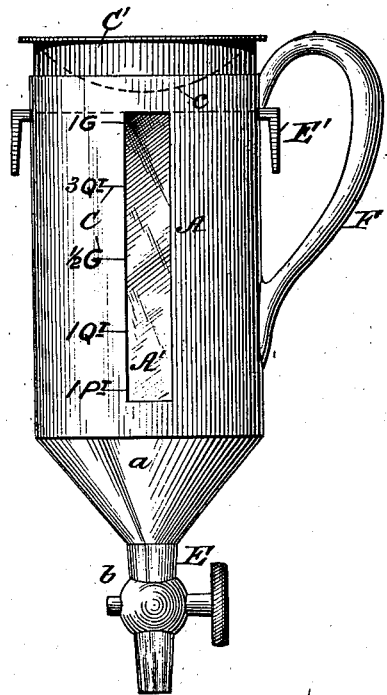
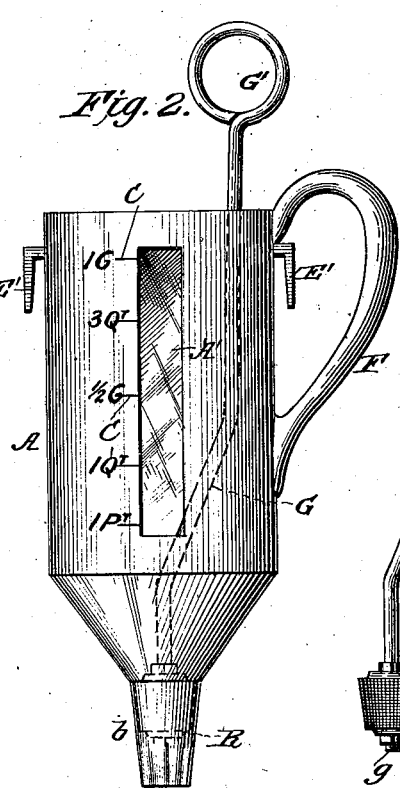
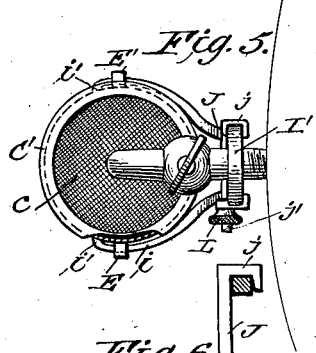
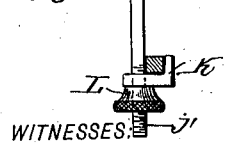
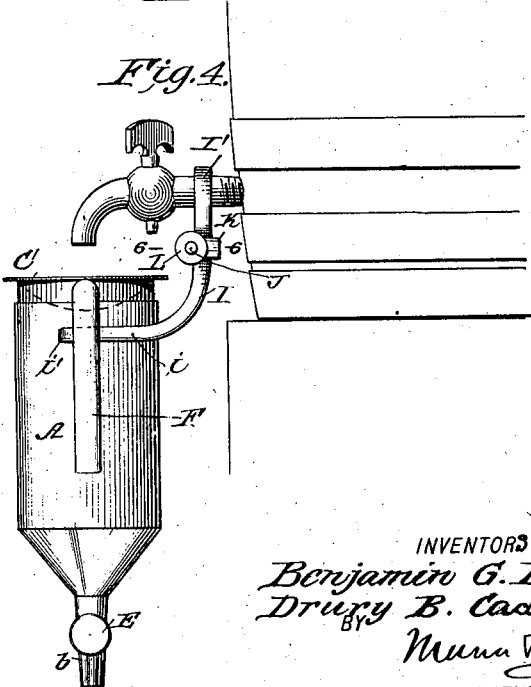
WITNESSES.
Fred G. Dieterich
M. D. Blondel
INVENTORS
Benjamin G. Reese.
Drury B. Cade.
BY Munn & Co
ATTORNEYS.

UNITED STATES PATENT OFFICE.

BENJAMIN G. REESE, OF MOUNT CARMEL, SOUTH CAROLINA, AND DRURY B. CADE, OF OVERTON, GEORGIA.

COMBINED MEASURE AND FUNNEL.

SPECIFICATION forming part of Letters Patent No. 525,232, dated August 28, 1894.

Application filed April 13, 1894. Serial No. 507,435. (No model.)

*To all whom it may concern:*

Be it known that we, BENJAMIN G. REESE, residing at Mount Carmel, in the county of Abbeville and State of South Carolina, and DRURY B. CADE, residing at Overton, in the county of Elbert and State of Georgia, have invented a new and Improved Combined Measure and Funnel, of which the following is a specification.

Our invention relates to that class of measures and funnels used for measuring fluid, as it is being extracted from one vessel, preparatory to its being transmitted to another, and it has primarily for its object, to provide a device of this kind of a simple and inexpensive construction, and which will effectively serve for its intended purposes.

It also has for its object to provide a combined measure and funnel having means for straining the fluid as it enters the measure, whereby to prevent the entrance of flies and other insects and filth from getting into such measure.

Furthermore it has for its object to provide suitably arranged supporting attachments adapted to be used in combination with such measure, whereby the same can be conveniently supported under the faucet of the vessel from which fluid is to be extracted.

With these objects in view our invention consists in the peculiar construction and novel arrangement of parts hereinafter first described in detail and then particularly pointed out in the appended claims, reference being had to the accompanying drawings, in which—

Figure 1 is a side view of our improved measure and funnel. Fig. 2 is a similar view thereof showing a modified arrangement of the valve or discharge end. Fig. 3 is a side view of the valve devices used in connection with the construction shown in Fig. 2. Fig. 4 is a side view of the measure and funnel, and the attachment for supporting the same on the faucet. Fig. 5 is a plan view of the parts shown in Fig. 4, and Fig. 6 is a cross section taken on the line 6—6, Fig. 2.

Referring to the accompanying drawings by letter, A, indicates the body of the combined measure and funnel, formed of sheet metal, preferably tin, the lower end of which is funnel shaped as at $a$, which in turn ends at a nozzle portion $b$, tapering and fluted whereby it can be fitted into the various vessels used to receive the fluid, and such nozzle when the device is to be used for measuring thin fluids, has a straightway valve or cock E, but when the device is used for measuring thick fluids, the nozzle has a straightway which is held closed by a rubber plug R fitted on the lower end of a bent rod, G, which extends up beyond the top of the measure and has a finger bail G' as most clearly shown in Fig. 2, the stopper being preferably held on the lower end of such rod by nuts R' R², which engage the threaded end $g$ of such rod as clearly shown in Fig. 3.

At one side the measure has a vertical sight aperture or gage portion A' covered by glass, and at one side of such aperture A' scale or gage marks C are produced on the body A, which may vary as the size of the measure may make it necessary. At diametrically opposite sides the body A, near the upper end has hook members or ears E', for a purpose presently explained, and at one side it has a handle F.

C indicates a removable top which is adapted to be fitted in the top of the measure as shown, and such top has a concave bottom $c$ formed of perforated metal or wire cloth. While the measure is being filled with a thin fluid, this top member is fitted in place, and while serving to catch all the drippings it effectively prevents insects and filth from entering the measure. By making such top detachable the same can be the more conveniently cleaned. When measuring thick or heavy liquids this top is removed.

I indicates a sear spring like clamp member, the forward ends $i$ of which have inturned portions $i'$ $i'$ which are adapted to bear against the sides of the body A when such body is supported on the clamp I, the ears of such body fitting over the said outer ends $i$ at a point just to the rear of the portions $i'$, as clearly shown in Fig. 5. This clamp member I, it will be seen from Fig. 3, has its rear portion turned up whereby its loop end I' will be adapted to fit on the faucet and while its lower end forms a pendent bracket which supports the measure.

As a simple means for holding the supporting clamp securely on the faucet and the measure secured on the clamp such clamp is provided with an adjusting device comprising a rod J, having a hook portion *j* at one end and a thread portion *j'* at the other, on which is fitted an adjusting screw L in front of which, loosely fitted on the rod J, is a hook member K.

Referring now to Fig. 6 it will be noticed that by adjusting the screw L, the arms *i i* of the clamp will contract or expand, and when contracted the loop end will snugly fit on the faucet, while the portions *i' i'* will press against the sides of the body A and hold the measure secure, which measure can be readily lifted from the support by slightly loosening the screw L.

Having thus described our invention, what we claim, and desire to secure by Letters Patent, is—

1. An improved combined measure and funnel comprising a body portion, having a funnel like bottom terminating in a discharge nozzle, a straight way cock for such nozzle, said body portion having a sight opening or gage at one side and a screening member adapted to be detachably fitted in the top of such body, such body having a handle portion, and hook members or ears all arranged substantially as shown and for the purposes described.

2. As an improvement in combined measures and funnels, the combination with the holder A, having ears E' at its diametrically opposite side of a supporting device formed of a spring clamp member I having members *i* adapted to pass under the ears E' and clamp the holder, and a loop whereby it can be connected to the faucet of a barrel, and an adjustable clamping member J, movable on the side members of the clamp I at a point between the loop and portions *i*, whereby the loop portion and the clamp members can be clamped together simultaneously substantially as shown and specified.

3. As an improvement in measuring funnels, the combination with the holder A having hook like ear portions E', of the supporting device I formed of a sear like spring clamp having inturned finger portions *i'* at the ends of its side members, its loop portion being curved up approximately at right angles to the said side members and an adjusting clamp comprising a rod J, having a hook portion at one end adapted to engage one of the side members of the clamp and threaded at its opposite end, a hook member K movable on the rod and an adjusting nut L on the aforesaid threaded end of the rod, all arranged substantially as shown and for the purposes described.

BENJAMIN G. REESE.
DRURY B. CADE.

Witnesses:
WM. L. MILLER,
M. L. KAY.